United States Patent [19]
Eldridge et al.

[11] 3,981,406
[45] Sept. 21, 1976

[54] AUTOMATIC BOX LOADER

[75] Inventors: Harry H. Eldridge, Monterey; Robert A. Jones, Oak Ridge; Gordon M. Lindner, Norris; Paul H. Hight, Lebanon, all of Tenn.

[73] Assignee: The United States of America as represented by the United States Energy Research and Development Administration, Washington, D.C.

[22] Filed: Oct. 31, 1975

[21] Appl. No.: 627,624

[52] U.S. Cl. .......................... 214/6 FS; 214/1 BT; 214/6 M
[51] Int. Cl.² ........................................ B65G 57/04
[58] Field of Search ................. 214/1 BT, 1 P, 6 FS, 214/6 PS, 6 M, DIG. 3; 53/148, 157, 164, 165

[56] References Cited
UNITED STATES PATENTS

| | | | |
|---|---|---|---|
| 3,298,564 | 1/1967 | Wheatley et al. | 221/10 |
| 3,338,376 | 8/1967 | Cross | 214/1 P X |
| 3,340,850 | 9/1967 | Elliott | 214/1 P X |
| 3,543,476 | 12/1970 | Jaroff et al. | 53/164 X |
| 3,951,274 | 4/1976 | Yamamoto | 214/6 FS |

*Primary Examiner*—L. J. Paperner
*Attorney, Agent, or Firm*—Dean E. Carlson; David S. Zachry; Fred O. Lewis

[57] ABSTRACT

This invention relates to a system for repetitively forming an assembly consisting of a single layer of tubes and a row of ferromagnetic armatures underlying the same, electromagnetically conveying the resulting assembly to a position overlying a storage box, and depositing the assembly in the box. The system includes means for simultaneously depositing a row of the armatures on the inclined surface of a tube retainer. Tubes then are rolled down the surface to form a single tube layer bridging the armatures. A magnet assembly carrying electromagnets respectively aligned with the armatures is advanced close to the tube layer, and in the course of this advance is angularly displaced to bring the pole pieces of the electromagnets into parallelism with the tube layer. The magnets then are energized to pick up the assembly. The loaded magnet assembly is retracted to a position overlying the box, and during this retraction is again displaced to bring the pole pieces of the electromagnets into a horizontal plane. Means are provided for inserting the loaded electromagnets in the box and then de-energizing the electromagnets to deposit the assembly therein. The system accomplishes the boxing of fragile tubes at relatively high rates. Because the tubes are boxed as separated uniform layers, subsequent unloading operations are facilitated.

10 Claims, 3 Drawing Figures

AUTOMATIC BOX LOADER

This invention was made in the course of, or under, a contract with the United States Energy Research and Development Administration.

BACKGROUND OF THE INVENTION

This invention relates generally to apparatus for transporting elongated cylindrical articles such as tubes. More particularly, it relates to apparatus for forming an assembly consisting of a single layer of tubes and an array of armatures therebelow and conveying the assembly to a station where it is deposited in a receptacle.

The apparatus of this invention has special application to the automatic conveying and boxing of fragile tubes which may or may not be composed of ferromagnetic material. It has been the practice to box such tubes by conveying them one by one to the mouth of the box and permitting them to drop a short distance therein. That practice not only damages a significant percentage of the tubes but also fails to deposit the tubes in symmetrical fashion, thus complicating subsequent recovery of the tubes from the box.

The known conveyor art includes tube conveyors in the form of movable trays, clamps, and belts, as well as electromagnets for transporting magnetic tubes. None of the known systems is considered highly suitable for conveying and boxing tubes in a manner preventing appreciable tube damage as well as unsymmetrical packing of the tubes in the storage container.

Figure 1:
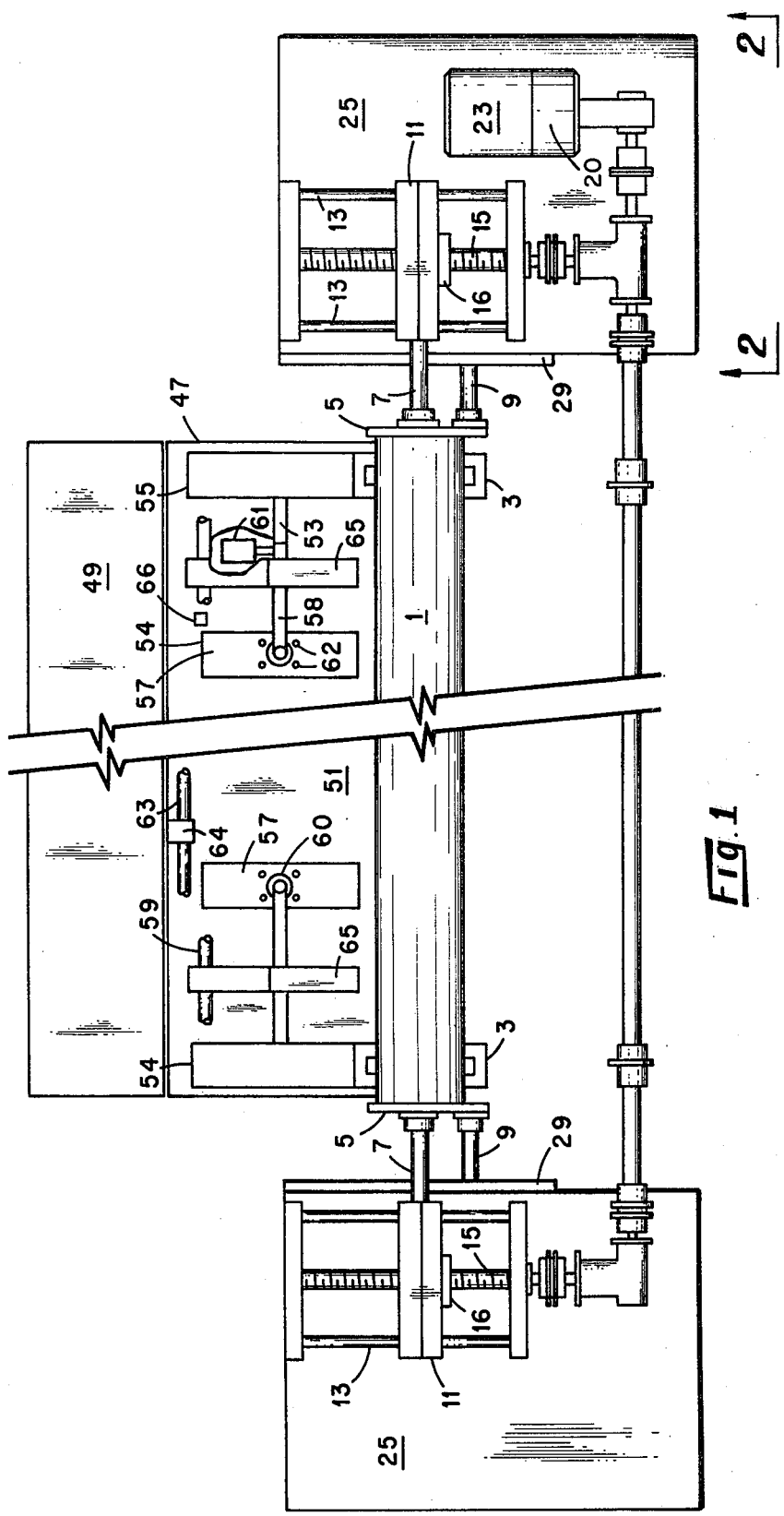
FIG. 1 is a plan view of a tube-handling system designed in accordance with this invention.

The drawings are not to scale. In some instances, only one of a plurality of like components is shown.

SUMMARY OF THE INVENTION

It is an objective of this invention to provide an improved system for conveying and boxing elongated cylindrical articles, such as fragile tubes.

It is another object to provide a system for repetitively conveying and boxing single layers of tubes, the tubes as boxed being essentially undamaged and disposed in uniform layers.

It is another object to provide a system for repetitively forming assemblies consisting of a single tube layer supported by ferromagnetic armatures, conveying each such assembly to a boxing station, and depositing the assembly in a storage box therefore. Other objects will be made evident hereinafter.

The invention can be summarized as follows:

A tube-handling system comprising a tube-retainer having an inclined face for retention of a layer of tubes; means for depositing on said face a plurality of ferromagnetic armatures; means for loading said retainer with a layer of said tubes bridging said armatures, thus providing an assembly comprising a tube layer and armatures underlying the same; transport means for said assembly, said means including an elongated member carrying a row of electromagnets; drive means for alternately effecting (a) advance of said member toward said retainer to a first station where said electromagnets are contiguous with said assembly and respectively in magnetic-coupling relation with the armatures thereof and (b) retraction of said member from said first station to a second station more remote from said retainer, said drive means including magnet-positioning means for angularly displacing said electromagnets toward said retainer in the course of said advance and away from said retainer in the course of said retraction.

DESCRIPTION OF THE PREFERRED EMBODIMENT

The illustrated embodiment of the invention includes a horizontal, cylindrical member 1 having affixed thereto a row of electromagnets 3. The electromagnets have coplanar flat pole pieces 4 (FIG. 3) extending transversely of the support member 1. Affixed to the ends of the member 1 are plate 5, each carrying two outwardly extending shafts 7 and 9. The shafts 7, or support shafts, have a common axis which extends above the member 1 and is vertically coplanar therewith. The shafts 9, or cam-follower shafts, have a common axis and are positioned forwardly and downwardly of the support shafts.

The outer ends of the aforementioned support shafts 7 are rotatably supported by guide blocks 11 (see FIG. 3), which are slidably mounted on pairs of horizontal guide rods 13 and driven therealong by lead screws 15 engaged with ball nuts 16 (FIG. 1) carried by the blocks. The lead screws are coupled through conventional gear boxes to a common reversible horizontal-drive motor 23 having an electric brake 20. As shown, the guide block assemblies are mounted on horizontal platforms 25, one of which also carries the motor-and-brake assembly 20,23.

Figure 3:
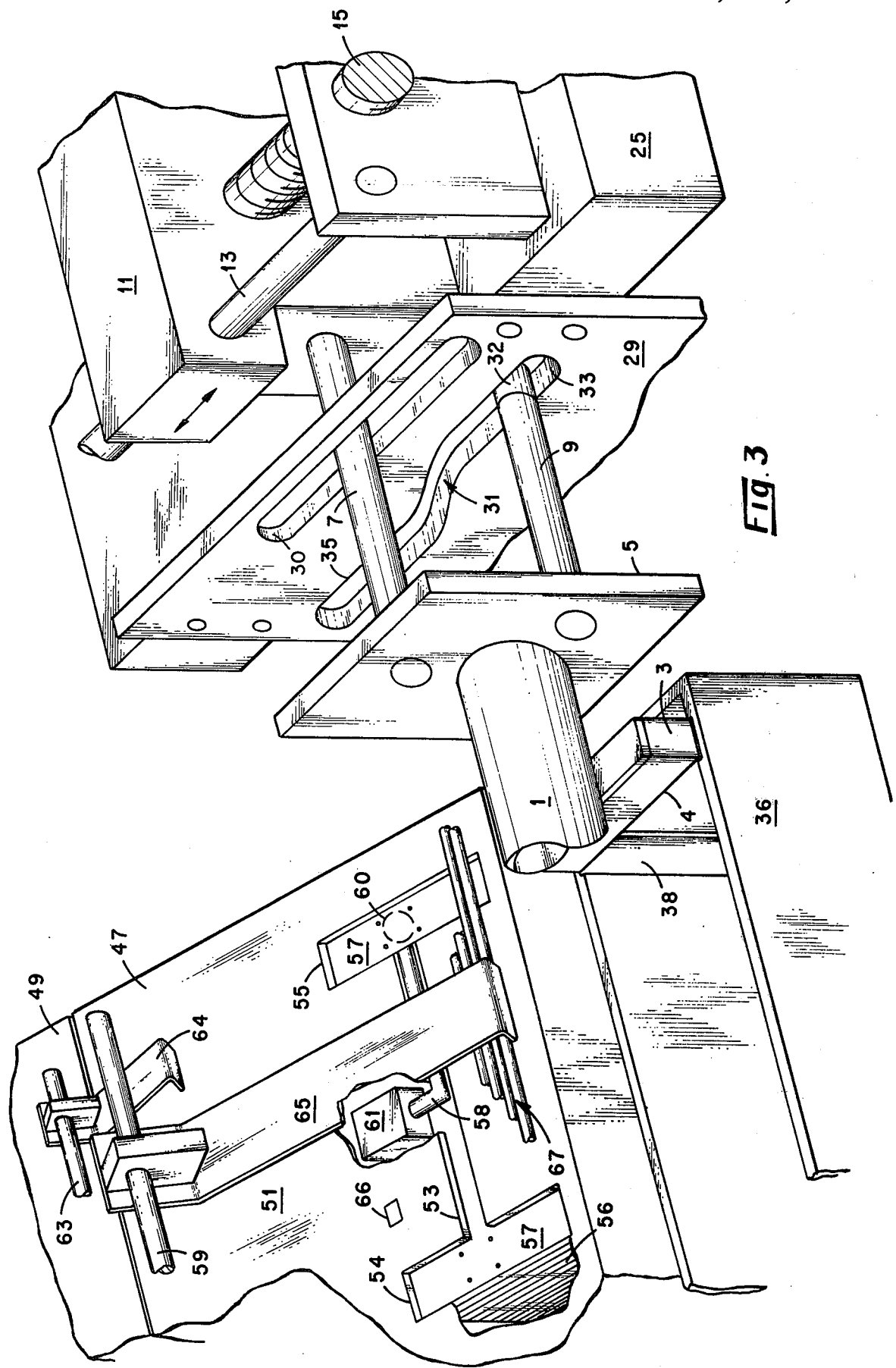
FIG. 3 is a perspective view of a portion of the system shown in FIGS. 1 and 2.

As shown most clearly in FIG. 3, the platforms 25 support lateral cam-plates 29. These are formed with apertures 30 for free passage of the shafts 7 and with generally horizontal slots 31 for supporting and guiding the outer ends of the aforementioned shafts 9. Preferably, the ends of the shafts 9 are provided with suitable bearings 32. The forward end sections 33 of the slots are elevated relative to the rearward end sections 35. With the shafts 9 are in the forward sections of the slots, the magnet assembly 1,3 is in a "full-forward" position where the pole pieces of the electromagnets lie in a common horizontal plane and are disposed over an elongated box 36 for a storage of armature-supported tube layers, to be described. As shown, the side walls of the box are formed with vertical channels 38 for endwise reception of the armatures. If the horizontal-drive motor 23 is energized to move the magnet assembly rearward, the cam-followers 9 are moved into the lower ends 35 of their respective guide slots, pivoting the magnet assembly about the axis of the shafts 7 and thus angularly displacing the magnets rearwardly and upwardly to a pickup position, to be described.

Figure 2:
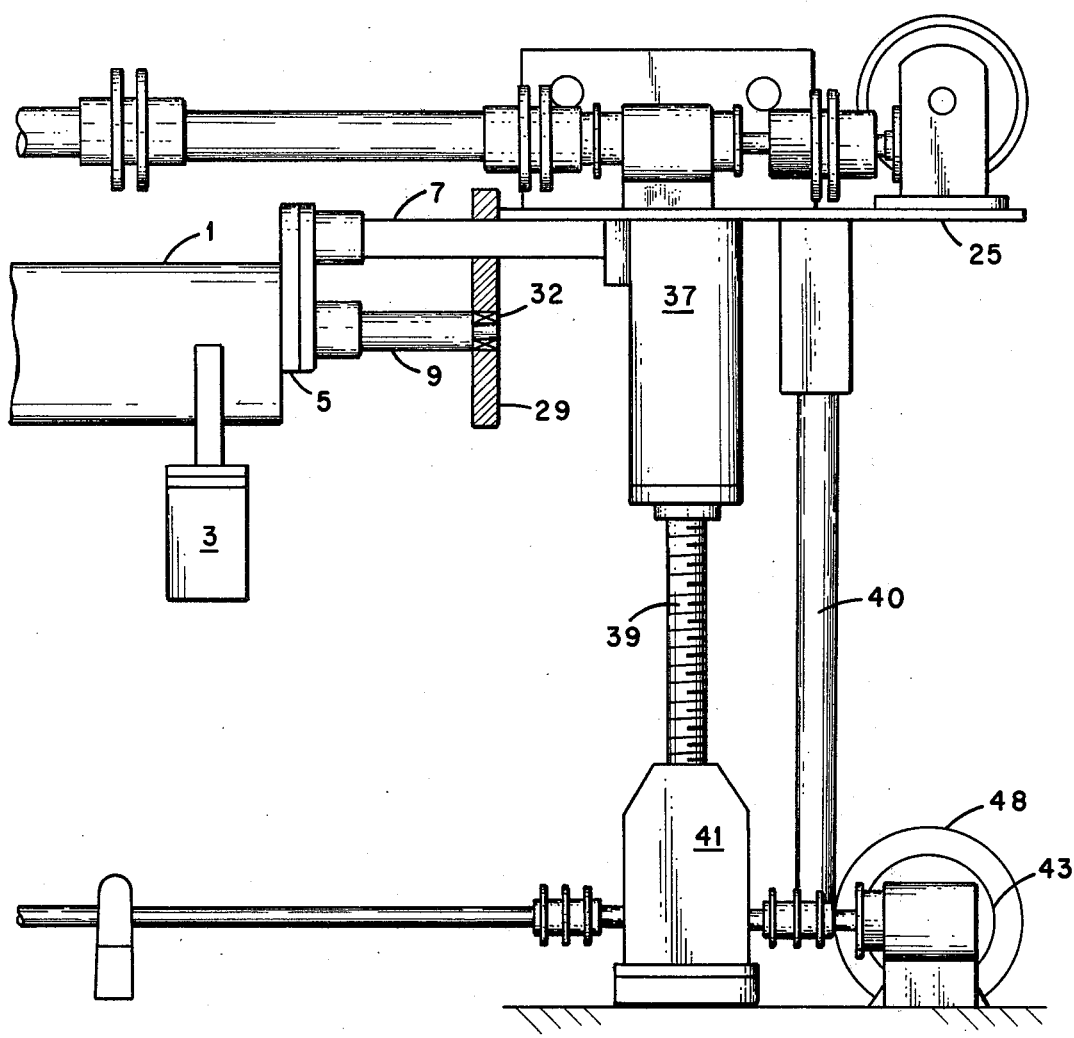
FIG. 2 is a front view taken along lines 2—2 of FIG. 1.

The above-mentioned platforms 25 are provided with similar vertical-drive systems, one of which is shown in FIG. 2. As indicated, the platforms are mounted on support blocks 37 and guide rods 40, which in turn are supported by lead screws 39 engaged with ball nuts 41 carried by the blocks. The lead screws are connected through conventional gearing to a common reversible electric motor 43 having an electric brake 48.

As shown most clearly in FIG. 3, a tube-retainer 47, or ramp, is positioned rearwardly of the magnet assembly, with its inclined face 51 extending toward and somewhat below that assembly. A dispenser 49 for metal tubes is positioned rearwardly of the retainer to roll tubes down the face 51, one at a time. The dispenser 49 may be of any suitable design and, if desired, may be of the kind described in U.S. Pat. No. 3,298,564, issued on Jan. 17, 1967, to S. J. Wheatley and H. K. McCaleb. The face 51 of the retainer 47 is formed with a plurality of longitudinally extending channels 53, each communicating at one end with an armature-supply port 54 and at the other with an armature-receiving recess 55. Extending upwardly into each port 54 is a stack 56 of ferromagnetic armatures 57, or plates, positioned below the retainer face 51. The typical armature is longer than the typical electromagnet pole piece 4. Referring again to the recesses 55, these are disposed in a row and each lies in the same vertical plane as one of the pole pieces 4.

Still referring to FIG. 3, each of the channels 53 houses a normally recessed armature-transfer arm 58, which carries a suction cup 60 at the outer end thereof. The inner end of the arm is connected to an electric motor 61 for swinging the arm between (a) an armature-pickup position where the arm is recessed in one end portion of the channel and the cup 60 is pressed firmly against the topmost armature of the stack 56, and (b) an armature-delivered position where the arm has swung into the other end of the channel and the cup 60 now underlies the armature, which it has deposited in the recess 55. The suction cup can be of standard design and is connected to any suitable vacuum system by lines (not shown) carried by the transfer arm 58. To offset the tendency for the topmost armature in a stack 56 to adhere to the armature next below, each armature is provided with vents 62 for maintaining the armature interface at atmospheric pressure. FIG. 3 shows a typical suction cup 60 in the armature-delivered position, whereas FIG. 1 shows suction cups in the armature-pickup position.

Extending above the topmost portion of the retainer face 51 is a shaft 63 (FIG. 3) carrying a plurality of similar tube-storage arms 64. Any suitable means (not shown) is provided for angularly displacing this shaft to move the arms to and from a position where their ends contact the face 51 to provide an upper temporary-storage region for tubes received from the dispenser 49. A similarly operated shaft 59 extends above a lower portion of the face 51 and is provided to raise and lower a plurality of tube-layer-retaining arms 65 carried thereby. A suitable detector 66, such as a phototube or electronic relay contact, is mounted in the face 51 to actuate control circuitry when a "full layer" of side-by-side tubes has accumulated under the arms 65; the width of the layer corresponds to the width of the aforementioned box 36. A tube layer 67 retained by the arms 65 is shown in part in FIG. 3. The layer bridges the aforementioned row of recesses 55.

The above-described system includes various conventional control elements — e.g., solenoid valves, electronic relays, microswitches, and logic circuits— for accomplishing a desired sequence of operations. A typical box-loading cycle is described below, beginning at the instant that the detector 66 in the face of the retainer 47 signals that a single full layer of tubes has accumulated under the retainer arms 65, now in the "down" position. Prior to this time, the transfer arms 58 have deposited an armature in each of the recesses 55, so that the tube layer 67 (FIG. 3) bridges the row of armatures in the recesses. The ends of the armatures extend somewhat beyond the uppermost and lowermost tubes of the layer (so as to subsequently fit into the side channels 38 of the storage box 36). Also, the magnet assembly 1,3 has previously been moved to its rearward position where the cam-follower shafts 9 are in the rearward sections 35 of the cam-plate slots 31. Thus, the electromagnets 3 now are at a "pickup station," meaning that they are positioned with their pole pieces extending parallel to and close to the tube layer, each pole piece being in register with an armature in a recess 55.

In response to the "full-layer" signal from the detector 66, the electromagnets are energized to establish magnetic coupling with their respective armatures 57 (and with the tube layer, if composed of ferromagnetic material). The shaft 59 now is actuated to lift the retainer arms 65 from the face 51 to a position where they no longer extend over the tube layer. At the same time, the shaft 63 is actuated to lower the storage arms 64 into contact with the face 51 to provide temporary storage for tubes being fed to the retainer. The horizontal-drive motor 23 now is actuated to move the magnet-carrying member 1 forward horizontally and convey the armature-and-tube-layer assembly from the pickup station to the aforementioned full-forward station above the box 36. A microswitch at the full-forward position de-energizes the motor 23 and energizes its brake. In the course of this forward movement, the cam-followers 9 are carried into the upper portions 33 of their respective guide slots, pivoting the member 1 so that the magnets are in the horizontal box-loading position shown in FIG. 3. Also, in the course of the forward movement of the member 1, the motors 61 for the armature-transfer arms 58 are energized simultaneously to swing the arms into the ports 54, where their suction cups 60 are pressed downward firmly against the topmost armature in their respective stacks 56.

Arrival of the transfer arms 58 in the ports 54 actuates a switch connecting the suction cups 60 to the vacuum system (not shown). After a preselected time delay, the transfer-arm motors 61 are reversed simultaneously to swing each transfer arm 58 to its original position where the cup 60 is in a recess 55, thus transferring the armature carried thereby into that recess. Electronic relays sense the presence of the armatures in the recesses and as a result disconnect the suction cups 60 from vacuum. The relays also actuate shaft 59 to lower the retainer arms 65 to "down" position and then actuate shaft 63 to lift the temporary-storage arms 64 from the face 51. Thus, any tubes held by the arms 64 are released to roll under the arms 65. Gradually another full layer of tubes accumulates under the arms 65 and bridges the newly deposited armatures 57.

Movement of the magnet assembly 1,3 into the fully forward position trips a switch to de-energize the horizontal-drive motor 23 and actuate its brake 20. The vertical-drive motor 43 now is energized to lower the platforms 25, thus lowering the electromagnets and the armature-and-tube layer assembly carried thereby into the box 36. The box previously has been positioned manually so that the projecting ends of the armature enter the vertical channels 38; these channels ensure that during storage the armatures remain in the desired position —i.e., transverse to the tube layer.

As the descending armature-and-tube-layer assembly enters the box 36, a downwardly extending conductivity probe carried by the magnet assembly senses the presence of the previously boxed tube layer to de-energize the vertical-drive motor 43 and energize its brake 48. The electromagnets now are de-energized to deposit the assembly on the previously boxed layer, after which the drive motor 43 is reversed to return the magnet assembly to the fully raised position shown in FIG. 3. Microswitches then de-energize the motor 43. Other microswitches now energize the horizontal-drive motor 23 to return the magnet assembly to the pickup station adjacent the retainer face 51. During retraction, the cam-followers 9 pivot the magnet assembly to return the magnet pole pieces to the desired pickup position, readying the system for another cycle of the kind just described.

The above-mentioned armatures 57 are composed of a ferromagnetic material compatible with the tubes being processed, and they are sized to reduce significantly the electrical power required by the electromagnets to convey a given layer of tubes. For instance, in one system designed in accordance with this invention, the use of armatures composed of stainless steel (Series 400) reduced electrical power requirements by a factor of 80. It is desirable to box the above-mentioned tubes as single layers separated by a row of armatures, for this greatly facilitates subsequent process operations where the tubes are to be removed from the storage box and fed into a machine in side-by-side relation. A suitable box-unloading system might include an electromagnet assembly similar to 1,3 for repetitively lifting an armature-supported tube layer from the box and transporting it to a position where the layer extends over a plurality of spaced conveyor belts extending at right angles thereto. De-energizing of the electromagnets would deposit the tube layer on the belts. The between-belt spacing would be selected to ensure that the armatures drop between the belts and into or onto suitable receivers.

The preceding description of one form of the invention is intended for the purpose of illustration, and it will be apparent to those skilled in the art that various modifications could be made in the same without departing from the principle of the invention. For instance, insertion of the tube-and-armature assembly in the box 36 may be accomplished by lifting and lowering of the box rather than the magnet assembly. That is, the platforms 25 can be made stationary and the box can be mounted on a vertically movable support. Again, other means than the cam-followers 9 can be employed to effect angular displacement of the magnets during horizontal movement of the magnet assembly. For example, the rotatably mounted support shafts 7 can be re-located to be coaxial with the member 1 so that positioning of the magnet assembly can be accomplished by angularly displacing the support shafts as the magnet assembly moves between the pickup and full-forward stations. The desired angular displacement of the support shafts can be effected by any suitable means, such as a rack-and-pinion, pneumatic-cylinder, or chain-and-sprocket arrangement. Again, it is apparent that the drive systems could be modified in conventional fashion to move the magnet assembly at a relatively slow rate at the beginning and end of its horizontal end vertical excursions and at a higher rate during the remainder of the excursions. The system described can include various conventional sensors, interlocks, and alarms to ensure that a given step in the cycle of operations has fulfilled its objectives before the next step is initiated. The term "tube" as used herein is used to include various other kinds of elongated cylindrical articles composed of either magnetic or non-magnetic material.

What is claimed is:

1. A tube-handling system comprising:
   a tube-retainer having an inclined face for retention of a layer of tubes;
   means for depositing on said face a plurality of ferromagnetic armatures;
   means for loading said retainer with a layer of said tubes bridging said armatures, thus providing an assembly comprising a tube layer and armatures underlying the same;
   transport means for said assembly, said means including an elongated member carrying a row of electromagnets; and
   drive means for alternately effecting (a) advance of said member toward said retainer to first station where said electromagnets are contiguous with said assembly and respectively in magnetic-coupling relation with the armatures thereof and (b) retraction of said member from said first station to a second station more remote from said retainer, said drive means including magnet-positioning means for angularly displacing said electromagnets toward said retainer in the course of said advance and away from said retainer in the course of said retraction.

2. The system of claim 1 wherein said drive means effects said advance and retraction by reciprocating said member in a horizontal plane.

3. The system of claim 2 wherein said member is supported by a pair of end shafts which have a common axis and which are rotatably supported by said drive means.

4. The system of claim 3 wherein said magnet-positioning means includes means for pivoting said member about the common axis of said shafts.

5. The system of claim 4 wherein the means for pivoting said member comprises a cam and cam-follower assembly.

6. The system of claim 1 wherein said face of said retainer is provided with a plurality of recesses for respectively housing armature-transfer arms, said recesses respectively communicating with ports formed in said face, said ports being respectively in vertical register with supply stacks of said armatures positioned under said face.

7. The system of claim 1 including an open-topped storage receptacle for said assembly, said receptacle being disposed beneath the second station and further including means for providing relative motion between said receptacle and said member when the latter is at the second station to effect insertion of said electromagnets into said receptacle.

8. The system of claim 1 wherein the tube layer bridging said armatures overlies only intermediate sections of said armatures, so that said armatures have portions extending outwardly of said tube layer.

9. The system of claim 8 wherein said receptacle is formed with vertical side channels for receiving the outwardly extending portions of said armatures.

10. A tube-handling system comprising:
    a tube-retainer having an inclined face for retention of a layer of tubes;
    means for depositing on said face a plurality of ferromagnetic armatures and including a plurality of armature-transfer arms normally recessed in channels in said face, each of said arms mounted for arcuate movement outwardly of said face;

means for loading said retainer with a layer of said tubes bridging said armatures, thus providing an assembly comprising a tube layer and armatures underlying the same;

transport means for said assembly, said means including an elongated member carrying a plurality of electromagnets having coplanar pole pieces; and drive means for reciprocating said member toward and away from said face and for angularly displacing said member in the course of its movement toward said face to position said pole pieces parallel to said face and for angularly displacing said member in the course of its movement away from said face to position said pole pieces in a horizontal plane.

* * * * *